US011433770B2

(12) United States Patent
El Khawly et al.

(10) Patent No.: US 11,433,770 B2
(45) Date of Patent: Sep. 6, 2022

(54) METHOD FOR SWITCHING OFF A CURRENT-EXCITED SYNCHRONOUS MACHINE OF A MOTOR VEHICLE

(71) Applicant: Bayerische Motoren Werke Aktiengesellschaft, Munich (DE)

(72) Inventors: Zakaria El Khawly, Munich (DE); Igor Gusyev, Munich (DE); Joerg Merwerth, Dachau (DE); Nuno Miguel Silva Cerqueira, Pastetten Zeilern (DE); Christian Steinbauer, Zandt (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 172 days.

(21) Appl. No.: 16/424,199

(22) Filed: May 28, 2019

(65) Prior Publication Data
US 2019/0275890 A1      Sep. 12, 2019

Related U.S. Application Data

(63) Continuation of application No. PCT/EP2017/078622, filed on Nov. 8, 2017.

(30) Foreign Application Priority Data

Nov. 29, 2016  (DE) ...................... 10 2016 223 624.5

(51) Int. Cl.
*B60L 3/04*      (2006.01)
*B60L 3/00*      (2019.01)
(Continued)

(52) U.S. Cl.
CPC .............. *B60L 3/04* (2013.01); *B60L 3/0061* (2013.01); *H02P 3/18* (2013.01); *H02P 25/022* (2013.01);
(Continued)

(58) Field of Classification Search
CPC .. B60L 3/04; H02P 25/024; H02P 3/18; H02P 25/022; H02P 27/06
(Continued)

(56) References Cited

U.S. PATENT DOCUMENTS 4,039,909 A * 8/1977 Baker ..................... H02K 19/12
                                                               318/732
6,353,307 B1   3/2002 Koelle et al.
(Continued)

FOREIGN PATENT DOCUMENTS

CN      103262407 A      8/2013
CN      103620943 A      3/2014
(Continued)

OTHER PUBLICATIONS

PCT/EP2017/078622, International Search Report dated Feb. 7, 2018 (Two (2) pages).
(Continued)

*Primary Examiner* — Kawing Chan
(74) *Attorney, Agent, or Firm* — Crowell & Moring LLP

(57) ABSTRACT

A method for switching off a current-excited synchronous machine of a motor vehicle, the current-excited synchronous machine having a rotor supplied by an excitation circuit of power electronics and a stator supplied via a bridge circuit of the power electronics, the method including interrupting a current supply to the rotor and the stator. The method further includes switching over the excitation circuit of the power electronics to a first freewheeling position, whereby energy contained in the excitation circuit and in the rotor is fed into a first energy store via a first feedback arrangement, and switching over the bridge circuit of the power electronics to a second freewheeling position, whereby energy contained in the bridge circuit and in the stator is fed into a second energy store via a second feedback arrangement.

13 Claims, 5 Drawing Sheets

(51) Int. Cl.
*H02P 3/18* (2006.01)
*H02P 25/022* (2016.01)
*H02P 27/06* (2006.01)
*H02P 25/024* (2016.01)
*H02P 101/45* (2016.01)

(52) U.S. Cl.
CPC ............ *H02P 25/024* (2016.02); *H02P 27/06* (2013.01); *H02P 2101/45* (2015.01); *H02P 2207/05* (2013.01)

(58) Field of Classification Search
USPC .......................................................... 318/700
See application file for complete search history.

(56) References Cited

U.S. PATENT DOCUMENTS

| | | | | |
|---|---|---|---|---|
| 8,544,575 | B1* | 10/2013 | Scaringe | B60K 6/485 |
| | | | | 180/65.22 |
| 9,694,693 | B1* | 7/2017 | Herman | B60L 50/61 |
| 9,821,661 | B2 | 11/2017 | Merkel et al. | |
| 2007/0240662 | A1* | 10/2007 | Kitamura | F02N 11/0818 |
| | | | | 123/179.4 |
| 2009/0302788 | A1 | 12/2009 | Mitsuda et al. | |
| 2013/0134909 | A1* | 5/2013 | Lee | H02K 7/006 |
| | | | | 318/139 |
| 2014/0163792 | A1* | 6/2014 | Kim | B60W 20/10 |
| | | | | 701/22 |
| 2015/0214858 | A1* | 7/2015 | Raichle | H02P 3/18 |
| | | | | 363/131 |
| 2017/0313193 | A1* | 11/2017 | Grossmann | H02P 3/22 |
| 2019/0207484 | A1* | 7/2019 | Shrestha | H02K 3/20 |
| 2019/0214933 | A1* | 7/2019 | Saha | H02M 7/53871 |
| 2019/0245466 | A1* | 8/2019 | Miyatake | H02K 13/003 |

FOREIGN PATENT DOCUMENTS

| | | |
|---|---|---|
| CN | 103813929 A | 5/2014 |
| DE | 694 20 743 T2 | 5/2000 |
| DE | 10 2009 051 490 A1 | 5/2011 |
| DE | 10 2010 001 247 A1 | 7/2011 |
| DE | 10 2012 200 932 A1 | 7/2013 |
| DE | 10 2013 226 560 A1 | 6/2015 |
| DE | 10 2014 209 607 A1 | 11/2015 |
| DE | 10 2015 202 440 A1 | 8/2016 |
| EP | 1 630 413 A1 | 3/2006 |
| EP | 1 042 860 B1 | 1/2011 |
| WO | WO 95/00996 A1 | 1/1995 |

OTHER PUBLICATIONS

German Search Report issued in German counterpart application No. 10 2016 223 624.5 dated Aug. 1, 2017, with Statement of Relevancy (Eight (8) pages).

Chinese Office Action issued in Chinese application No. 201780059550.2 dated Nov. 3, 2021, with English translation (Sixteen (16) pages).

* cited by examiner

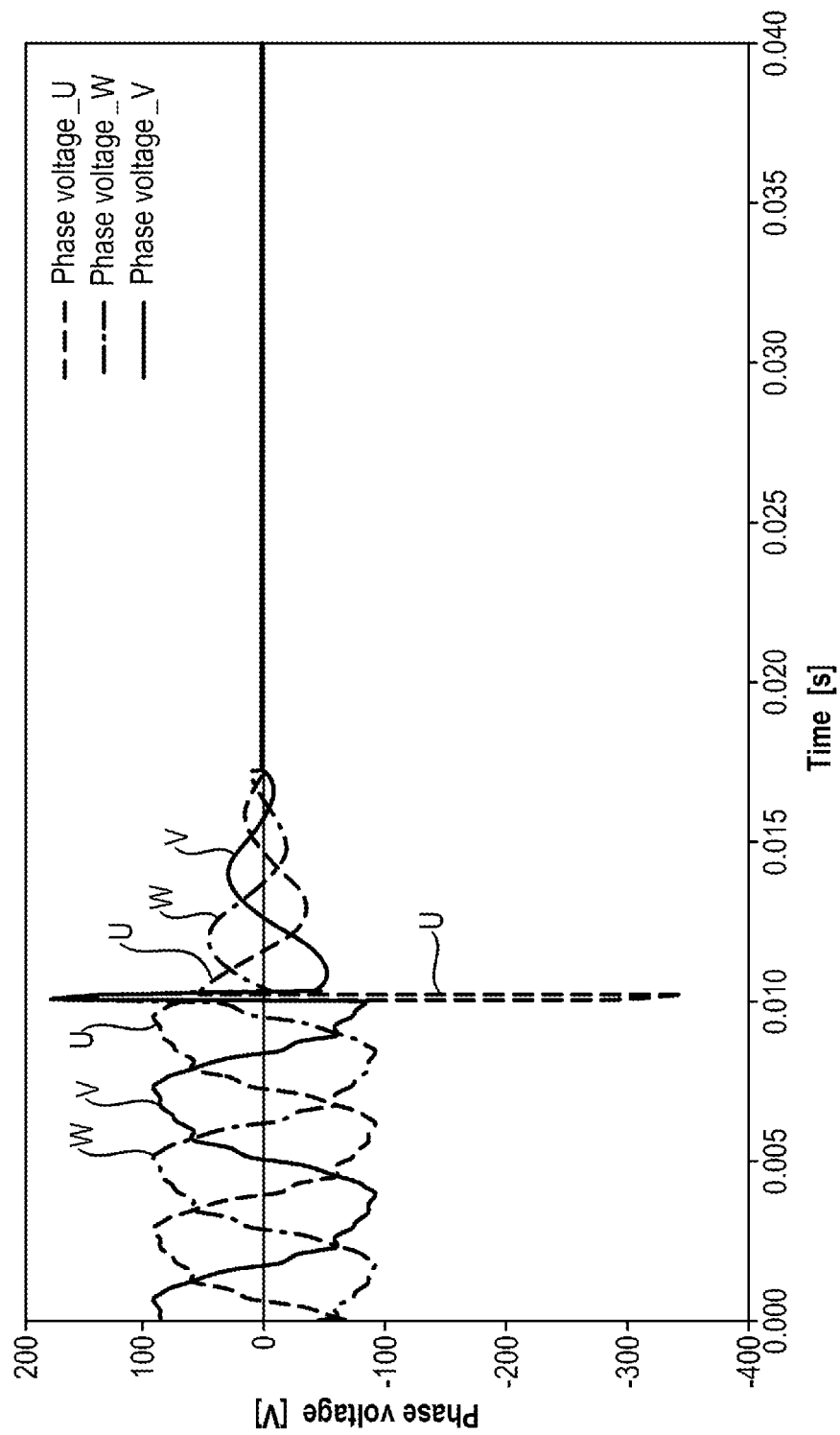

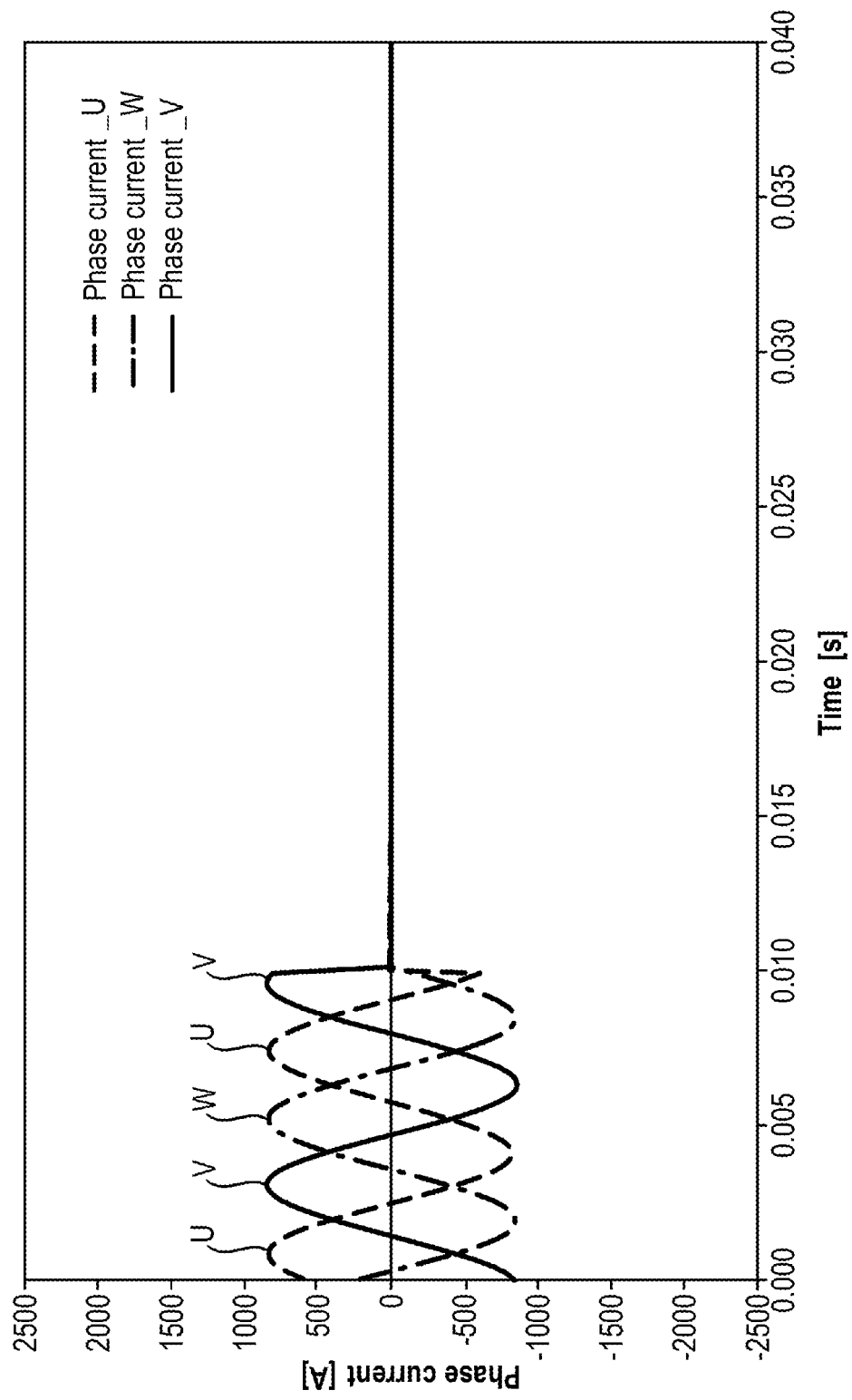

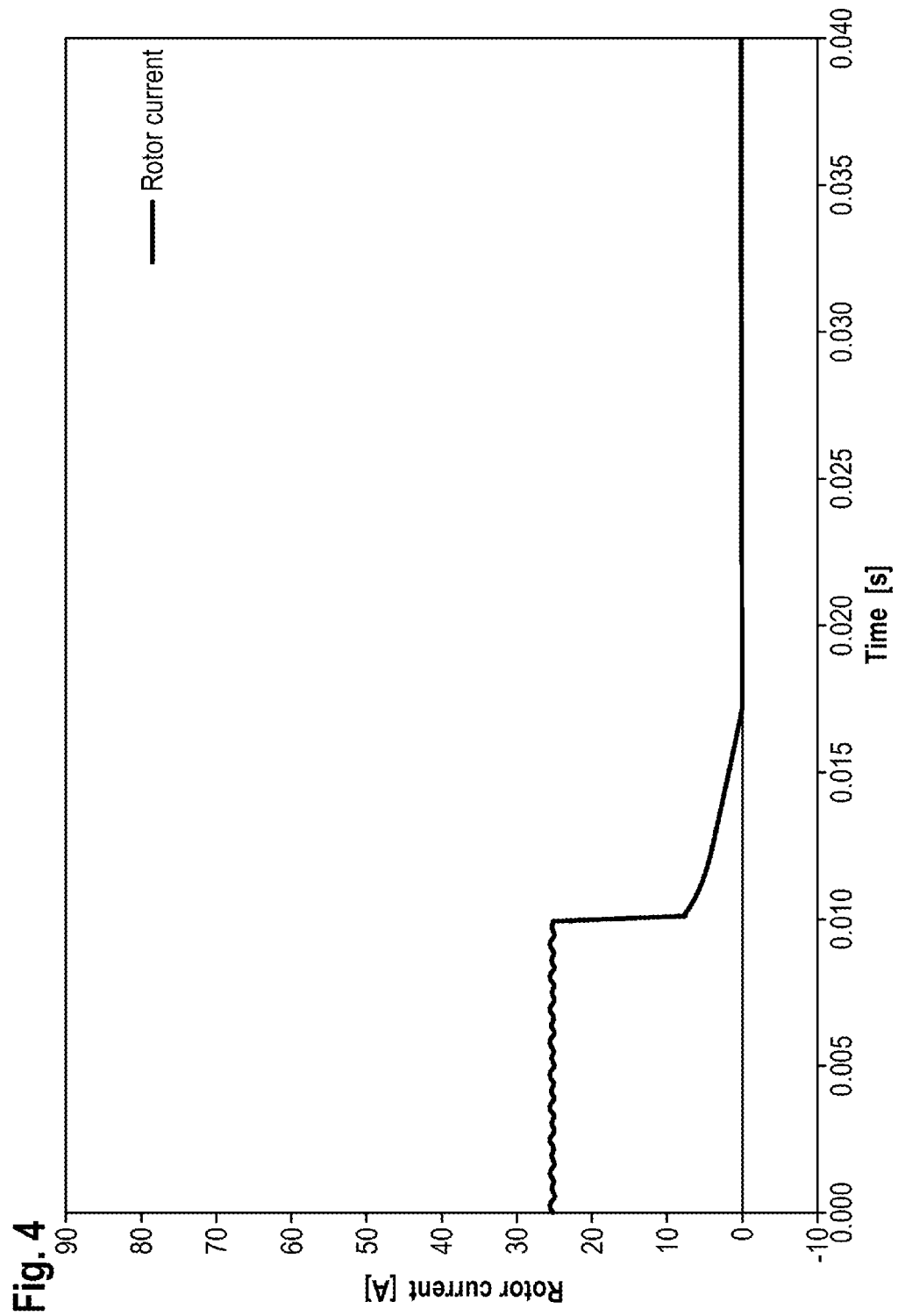

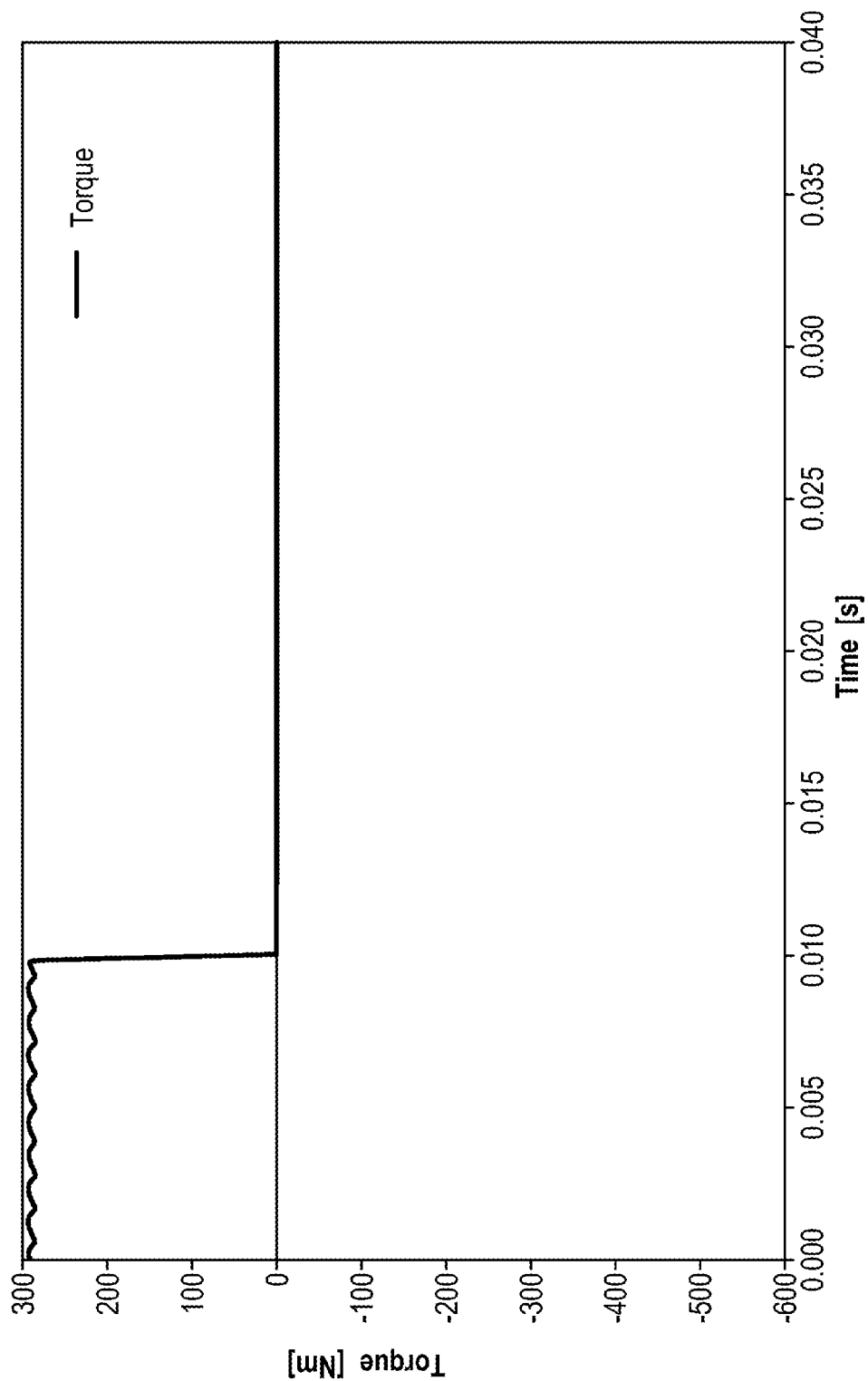

METHOD FOR SWITCHING OFF A CURRENT-EXCITED SYNCHRONOUS MACHINE OF A MOTOR VEHICLE

CROSS REFERENCE TO RELATED APPLICATIONS

This application is a continuation of PCT International Application No. PCT/EP2017/078622, filed Nov. 8, 2017, which claims priority under 35 U.S.C. § 119 from German Patent Application No. 10 2016 223 624.5, filed Nov. 29, 2016, the entire disclosures of which are herein expressly incorporated by reference.

BACKGROUND AND SUMMARY OF THE INVENTION

The present invention relates to a method for switching off a current-excited synchronous machine of a motor vehicle, comprising a rotor and a stator and supplied by means of power electronics, an appropriate control system for the execution of said method, and a motor vehicle equipped therewith.

Current-excited synchronous machines constitute a useful alternative to permanent magnet-excited synchronous machines, as magnetless machines of this type have a number of advantages: in the event of a malfunction in the power electronics, no braking torque is applied to the motor shaft, no drag torque is associated with the entrainment of a switched-off machine and, at higher speeds of rotation, a constant power output is available. Moreover, the necessary materials are very easily obtainable, and associated production costs are comparatively low.

In accordance with the different structural configuration of current-excited synchronous machines, the procedure for the switch-off thereof must also be adapted. Specifically, it must also be ensured that current-excited synchronous machines of this type can be rapidly and reliably disconnected by means of an emergency shutdown function, in order to provide protection against hazardous contact voltages, malfunctions of the machine and improper torque. Moreover, it must be ensured that the drive system is not damaged by transient torques, that the inverter is not damaged by transient currents in the stator, that the exciter in the intermediate current circuit is not damaged by transient currents in the rotor, and that the de-excitation time constant is dimensioned such that any damage in the low-voltage system can be prevented.

An object of the present invention is providing a method for switching off a current-excited synchronous machine of a motor vehicle which fulfills the above-mentioned requirements, and which is also suitable for the—fastest possible—emergency shutdown. A further object of the present invention is the disclosure of an appropriate control system for the execution of this method.

By the method according to the invention, for the switch-off of the current-excited synchronous machine, both the rotor and the stator are isolated from the power supply, and the excitation circuit provided for the supply of the rotor and the bridge circuit provided for the supply of the stator are respectively switched to a freewheeling position, such that the energy stored in these circuits, and in the rotor and stator, is fed or fed back into an energy store. A number of advantages are achieved by this process: no transient currents occur, no transient braking torque is generated (at least provided that the voltage on the energy store is greater than the induced phase voltage), and the excitation time is very short. Moreover, manufacturing costs for the inverter can be reduced, as these components are not required to accommodate any transient currents.

It is advantageous if the supply of current to the rotor and the stator on the one hand, and the switchover of the excitation circuit and the bridge circuit to the freewheeling position on the other, are executed simultaneously—or at least essentially simultaneously.

In the control system according to the invention, switches for the interruption of the current supply to the rotor and stator, and switches for the switchover of the excitation circuit and the bridge circuit to a respective freewheeling position, are provided. Additionally, a first and a second feedback arrangement are provided, by means of which, in the respective freewheeling position, energy stored in the excitation circuit and in the rotor, or in the bridge circuit and the stator, can be fed or fed back into a respective energy store.

An exceptionally simple and cost-effective execution of the feedback arrangements is possible, if the latter are constituted by respective freewheeling diodes.

It is advantageous if the two energy stores are respectively constituted as a high-voltage energy store. Alternatively, a common high-voltage store can also be provided for the take-up of energy from the rotor and the stator.

Advantageously, the energy store or high-voltage store are respectively constituted by an intermediate circuit capacitor of a current converter of the power electronics, or by a common intermediate circuit capacitor for both circuits. As an alternative to an intermediate circuit capacitor, an accumulator can also be employed.

The present invention is also considered to include a motor vehicle, equipped with a current-excited synchronous machine which comprises inter alia a rotor and a stator. A motor vehicle of this type further comprises power electronics, having an excitation circuit for the supply of the rotor and a bridge circuit for the supply of the stator. Energy stores are further provided, which are designed for the take-up of energy from the power electronics, the rotor and the stator. This motor vehicle is characterized in that it comprises a control system according to the invention according to the preceding description, by means of which the above-mentioned method according to the invention can be executed. Accordingly, identical or similar advantages are realized herefrom as those arising from the preceding description, on the grounds of which, in the interests of avoiding repetition, the reader is referred to the preceding statements concerning the method according to the invention and the control system according to the invention.

An advantageous form of embodiment of the invention is described hereinafter, for exemplary purposes, with reference to the figures. In the figures:

Other objects, advantages and novel features of the present invention will become apparent from the following detailed description of one or more preferred embodiments when considered in conjunction with the accompanying drawings.

BRIEF DESCRIPTION OF THE DRAWINGS

FIG. 2 shows the phase voltages of a switched-off current-excited synchronous machine according to the invention, in volts, for phases U, V, W of the stator.

FIG. 3 shows the phase currents of a switched-off current-excited synchronous machine according to the invention, in amperes, for phases U, V, W of the stator.

FIG. 4 shows the rotor current of the switched-off current-excited synchronous machine according to the invention, in amperes.

FIG. 5 shows the torque of the switched-off current-excited synchronous machine according to the invention, in newton-meters.

DETAILED DESCRIPTION OF THE DRAWINGS

Figure 1:
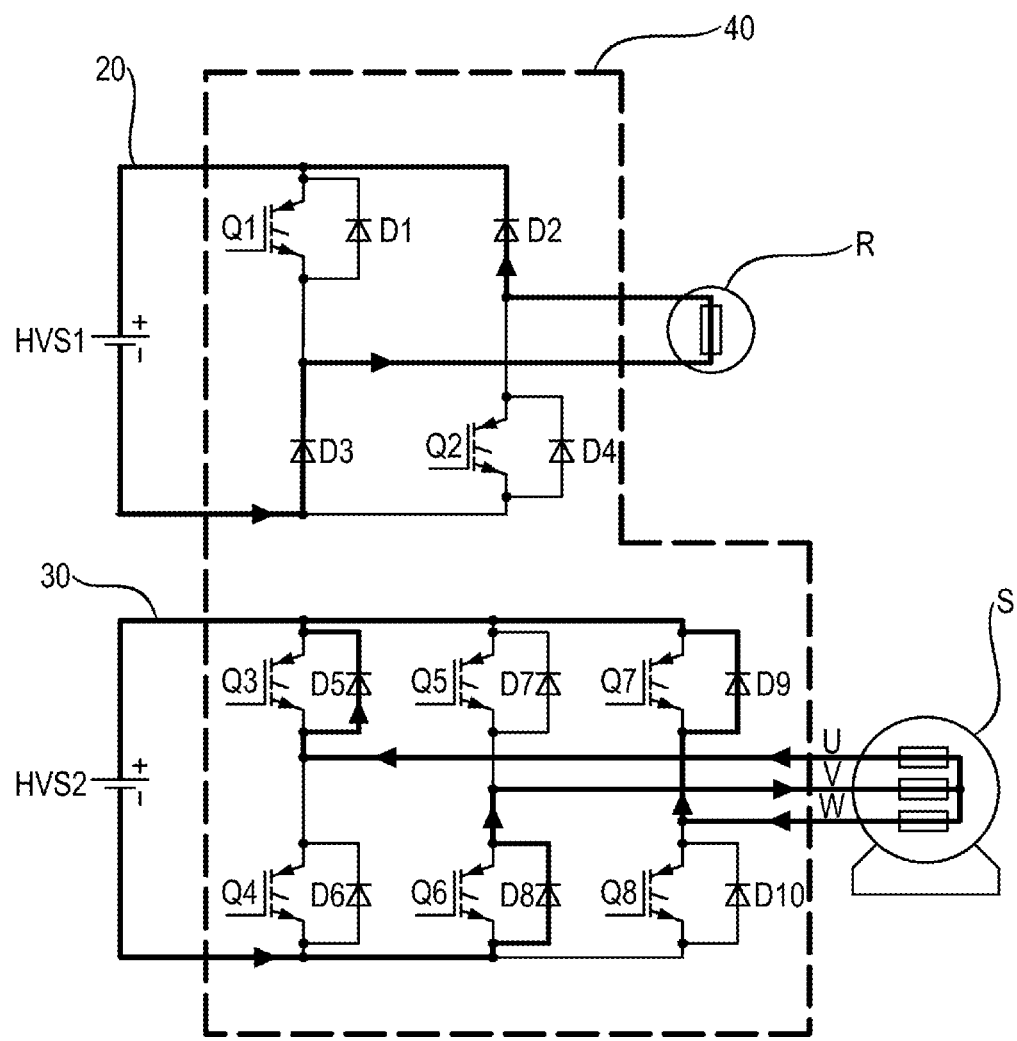
FIG. 1 shows an equivalent circuit diagram of one form of embodiment of a control system according to the invention for a current-excited synchronous machine.

FIG. 1 shows a schematic representation of a control system 40 according to the invention. The control system 40 comprises an excitation circuit 20 for the voltage and current supply of a rotor R from a first high-voltage store HVS1, and a bridge circuit 30 for the voltage and current supply of a stator S from a second high-voltage store HVS2. In the representation according to FIG. 1, two different high-voltage stores HVS1 and HVS2 are accordingly provided. However, it is also possible for both circuits to access only a single and common high-voltage store.

In the excitation circuit 20, two switches are provided in the form of transistors Q1 and Q2, which are respectively parallel-connected to a diode D1 or D4. In normal duty, i.e. during the supply of current to the rotor R, the transistors Q1 and Q2 are switched simultaneously. Current flows via the transistors Q1 and Q2, where the latter are switched on. During the switch-off phase of the transistors Q1 and Q2, current flows via two freewheeling diodes D2 and D3.

For the switch-off of the rotor R (including in the event of an emergency shutdown), the transistors Q1 and Q2 are no longer actuated. The excitation circuit 20 is thus switched to a "freewheeling position". Energy contained in the rotor R (and, where applicable, in the excitation circuit 20) is then evacuated via the two diodes D2 and D3, and is fed or fed back into the first high-voltage energy store HVS1. The resulting current flux is schematically represented by a line which is printed in bold, with corresponding arrows. In other words, energy contained in the rotor R is not "dissipated" via a resistor, as per the execution of an active short-circuit, but is recovered, thereby enhancing energy efficiency. It can be seen that the two diodes D2 and D3 function as a feedback arrangement for the injection of energy contained in the rotor R into the first high-voltage store HVS1. It can moreover be seen that the two transistors Q1 and Q2 function as switches, both for the switch-off of the current supply to the rotor R and for the switchover of the excitation circuit 20 to the freewheeling position.

In the bridge circuit 30, six switches are provided in the form of transistors Q3 to Q8, which are respectively connected in parallel with one of the respective diodes D5 to D10. In normal duty, i.e. during the supply of current to the stator S via the three phase conductors U, V, W, the transistors Q3 to Q8, in the customary manner for current converters, are actuated by a pulse-width modulated signal. In the bridge circuit 30, current again flows via the transistors Q3 to Q8, where the latter are switched on. During the switch-off phase of the transistors Q3 to Q8, the diodes D5 to D10, which function as freewheeling diodes, accommodate the current flux.

For the switch-off of the stator S (here again, including emergency shutdown), all the transistors Q3 to Q8 are no longer actuated, and thus execute a blocking function. The bridge circuit 30 is thus switched to a "freewheeling position". Insofar as possible, the blocking of the transistors Q3 to Q8 should be executed simultaneously with the blocking of transistors Q1 and Q2. Energy contained in the stator S (and, where applicable, in the bridge circuit 30), in the operating state represented in FIG. 1, will then be evacuated via the three diodes D5, D8 and D9, and fed or fed back into the second high-voltage energy store HVS2. The resulting current flux is again schematically represented by lines which are printed in bold, and by corresponding arrows for the three phases U, V, W. In other words, energy contained in the stator S is likewise not "dissipated" via a resistor, as per the execution of an active short-circuit, but is recovered, thereby further enhancing energy efficiency. It can be seen that the six diodes D5 to D10 function as a feedback arrangement for the injection of energy contained in the stator S into the second high-voltage store HVS2. It can moreover be seen that the six transistors Q3 to Q8 function as switches, both for the switch-off of the current supply to the stator S and for the switchover of the bridge circuit 30 to the freewheeling position.

FIGS. 2 to 5 show respective representations of relevant variables in a current-excited synchronous machine, in normal duty and after a switch-off according to the invention at time T=0.01 s. Resulting values in normal duty are as follows: torque M=294 Nm, stator current Istator=600 $A_{eff}$, rotor current Irotor=25 A, speed n=3,000 r.p.m.

FIG. 2 shows the phase voltages, in volts, for the phases U, V, W (of the stator).

FIG. 3 shows the phase currents, in amperes, for the phases U, V, W (of the stator).

FIG. 4 shows the rotor current, in amperes.

FIG. 5 shows the torque, in newton-meters.

From the preceding description, in conjunction with the figures, it will be seen that the method according to the invention for switching off a current-excited synchronous machine—by means of a control system according to the invention—prevents any transient currents and transient torque and, on the basis of the above-mentioned output data, permits rapid de-excitation within 10 ms. In other words, there is no transient overshoot with respect to the torque, stator currents and the rotor current.

According to the above representation, the switches are respectively constituted as an IGBT. It is understood that, without loss of generality, other power transistors which can be used as switches can also be employed instead. Moreover, the two high-voltage stores HVS1 and HVS2 are represented as two separate components; however, they can also be integrated to constitute a single component, for example an intermediate circuit capacitor in an intermediate circuit of the power electronics.

It is understood that, in the present invention, a connection exists between, on the one hand, characteristics which have been described in connection with process steps and, on the other hand, characteristics which have been described in connection with corresponding devices. Accordingly, described process characteristics are also to be understood as characteristics of devices according to the invention—and vice versa—even in the absence of explicit reference to this effect.

It should be observed that characteristics of the invention described with reference to one form of embodiment or variants thereof including, for example, the type and configuration of the individual circuit components and the spatial arrangement thereof, or detailed arrangements for the execution of individual process steps, can also be present in other forms of embodiment, unless indicated otherwise or precluded per se for technical reasons. Moreover, of those characteristics of individual forms of embodiment, which are described in combination, not necessarily all said characteristics need to be realized in one given form of embodiment.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for switching off a current-excited synchronous machine of a motor vehicle, the current-excited synchronous machine comprising a rotor and a stator, the method comprising the acts of:
   supplying the rotor with a rotor drive current from a first energy store via an excitation circuit of power electronics, and the stator with a stator drive current from a second energy store via a bridge circuit of the power electronics;
   interrupting the rotor drive current supply to the rotor and the stator drive current supply to the stator, so as to isolate the rotor from the rotor drive current and the stator from the stator drive current;
   switching over the excitation circuit of the power electronics to a first freewheeling position, whereby only residual rotor drive current contained in the excitation circuit and in the rotor is fed back into the first energy store via a first feedback arrangement, and such that there is no transient overshoot with respect to the rotor current; and
   contemporaneous with switching over the excitation circuit of the power electronics to the first freewheeling position, switching over the bridge circuit of the power electronics to a second freewheeling position, whereby only residual stator drive current contained in the bridge circuit and in the stator is fed back into the second energy store via a second feedback arrangement, and such that there is no transient overshoot with respect to the stator current.

2. The method as claimed in claim 1, wherein interrupting the current supply to the rotor and the stator, said switching over of the excitation circuit to the freewheeling position, and said switching over of the bridge circuit to the freewheeling position are carried out at least essentially simultaneously.

3. A control system configured to switch off a current-excited synchronous machine of a motor vehicle, the current-excited synchronous machine comprising a rotor and a stator, wherein the rotor is supplied with a rotor drive current from a first energy store via an excitation circuit of power electronics, and the stator is supplied with a stator drive current from a second energy store via a bridge circuit of the power electronics, the control system comprising:
   a first set of switches configured to interrupt the rotor drive current supply to the rotor and the stator drive current supply to the stator, so as to isolate the rotor from the rotor drive current and the stator from the stator drive current;
   a second set of switches configured to switch over the excitation circuit to a first freewheeling position;
   a first feedback arrangement via which, in the first freewheeling position, only residual rotor drive current contained in the excitation circuit and in the rotor is fed back into the first energy store, and there is no transient overshoot with respect to the rotor current,
   a third set of switches configured to switch over the bridge circuit to a second freewheeling position contemporaneous with the second set of switches switching over the excitation circuit of the power electronics to the first freewheeling position; and
   a second feedback arrangement, via which, in the second freewheeling position, only residual stator drive current contained in the bridge circuit and in the stator is fed back into the second energy store, and there is no transient overshoot with respect to the stator current.

4. The control system as claimed in claim 3, wherein the first feedback arrangement and the second feedback arrangement are constituted as freewheeling diodes.

5. The control system as claimed in claim 3, wherein the first energy store and the second energy store are respectively constituted as a high-voltage store or as a common high-voltage store.

6. The control system as claimed in claim 4, wherein the first energy store and the second energy store are respectively constituted as a high-voltage store or as a common high-voltage store.

7. The control system as claimed in claim 3, wherein the first energy store and the second energy store are constituted as a respective, or as a common intermediate circuit capacitor of a current converter of the power electronics.

8. The control system as claimed in claim 4, wherein the first energy store and the second energy store are constituted as a respective, or as a common intermediate circuit capacitor of a current converter of the power electronics.

9. The control system as claimed in claim 5, wherein the first energy store and the second energy store are constituted as a respective, or as a common intermediate circuit capacitor of a current converter of the power electronics.

10. The control system as claimed in claim 3, wherein the first energy store and the second energy store are constituted as a respective, or as a common accumulator.

11. The control system as claimed in claim 4, wherein the first energy store and the second energy store are constituted as a respective, or as a common accumulator.

12. The control system as claimed in claim 5, wherein the first energy store and the second energy store are constituted as a respective, or as a common accumulator.

13. A motor vehicle, comprising:
   a current-excited synchronous machine including a rotor and a stator;
   power electronics including: an excitation circuit that supplies a rotor drive current from a first energy store to the rotor, and a bridge circuit that supplies a stator drive current from a second energy store to the stator; and
   a control system comprising:
      a first set of switches configured to interrupt the rotor drive current supply to the rotor and the stator drive current supply to the stator, so as to isolate the rotor from the rotor drive current and the stator from the stator drive current,
      a second set of switches configured to switch over the excitation circuit to a first freewheeling position,
      a first feedback arrangement via which, in the first freewheeling position, only residual rotor drive current contained in the excitation circuit and in the rotor is fed back into the first energy store, and there is no transient overshoot with respect to the rotor current,
      a third set of switches configured to switch over the bridge circuit to a second freewheeling position contemporaneous with the second set of switches switching over the excitation circuit of the power electronics to the first freewheeling position, and
a second feedback arrangement, via which, in the second freewheeling position, only residual stator drive current contained in the bridge circuit and in the stator is fed back into the second energy store, and there is no transient overshoot with respect to the stator current.

* * * * *